Feb. 26, 1952  H. ROSELLE, JR  2,586,865
ARTICLE TRANSFER DEVICE FOR CONVEYERS
Filed Nov. 29, 1949
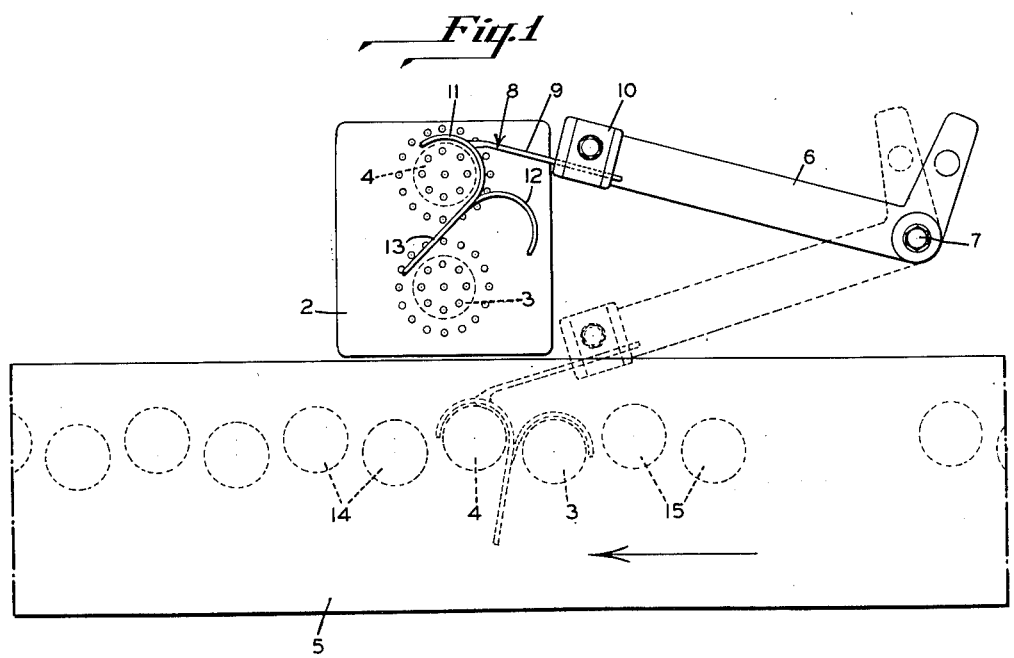
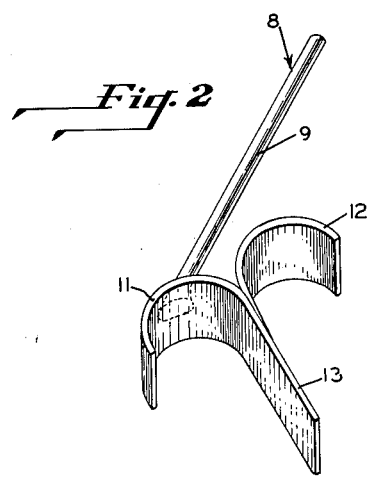
Inventor
HERBERT ROSELLE, JR.
by
Walter F Kaufman
Attorney Patented Feb. 26, 1952

2,586,865

UNITED STATES PATENT OFFICE 2,586,865

ARTICLE TRANSFER DEVICE FOR CONVEYERS

Herbert Roselle, Jr., Millville, N. J., assignor to Armstrong Cork Company, Lancaster, Pa., a corporation of Pennsylvania Application November 29, 1949, Serial No. 129,937

4 Claims. (Cl. 198—24)

This invention relates to a transfer device particularly useful in the transferring of glassware from a cooling dead plate to a transfer conveyor.

In glassmaking, ware is delivered from the forming molds to a dead plate where cooling air is applied to the outer surface of the ware to reduce its temperature. The ware is then transferred to a conveyor which delivers the ware for stacking in a lehr. In modern glassware making machines, the ware is frequently disposed on the dead plate in pairs and each pair of articles must be transferred simultaneously from the dead plate to the conveyor.

An object of this invention is to provide a mechanism which will transfer a plurality of articles from a dead plate location to a moving conveyor and position the articles on the conveyor in closely spaced relationship.

Another object of the invention is to provide a transfer mechanism which will be effective for transferring a plurality of articles aligned generally at right angles to the direction of travel of a conveyor to a position on said conveyor with the articles aligned generally parallel to the direction of travel of the conveyor.

A further object of the invention is to provide a transfer device including a pusher which is so constructed that very close longitudinal spacing of the ware on the conveyor may be obtained.

Other objects and advantages of the invention will become apparent from consideration of the following detailed description of an embodiment of the invention which is shown in the accompanying drawing and in which:

Figure 1 is a partial plan view of the device of the present invention; and

Figure 2 is a perspective view of a pusher for handling round bottles.

Referring to Figure 1, there is shown an apertured dead plate 2 which has two round bottles 3 and 4 positioned thereon for cooling, having been delivered there from a so-called "'double gob" glassware forming machine, for example. A conveyor 5 is positioned alongside of the dead plate 2 and is slowly moved in the direction of the arrow to deliver glassware to an annealing lehr, for example. It will be noted that the bottles 3 and 4 are aligned on the dead plate 2 at substantially right angles to the length of the conveyor 5. The upper surface of the conveyor 5 is substantially level with the upper surface of the dead plate 2 to facilitate the sliding of the bottles from the dead plate to the conveyor.

The transfer mechanism includes an oscillating arm 6 of conventional design secured to a rock shaft 7 for swinging movement from the solid line position to the dotted line position shown in Figure 1. Attached to the arm 6 is a two-pocket pusher 8 having a connecting bar 9 welded thereto. The bar 9 is adjustably secured to the arm 6 by a clamping plate 10.

The ware receiving pockets 11 and 12 of the pusher 8 are preferably formed of sheet metal and are separated by a projecting guide 13 which may be integral with the pocket 11, and the other pocket 12 may be welded, brazed or otherwise secured thereto. It will be noted by reference to Figure 1 that when the transfer device is in the solid line position, the bottle 4 will be disposed within the pocket 11 but that the bottle 3 will be disposed out of the pocket 12 adjacent to the outer end of guide 13. The guide 13 projects outwardly beyond the open ends of the pockets and is disposed generally at right angles to a vertical plane intersecting the axes of the pockets as shown in Figure 1. As the arm 6 is rocked about the center of rock shaft 7, the guide 13 engages the bottle 3, and it is delivered within pocket 12 as the pusher 8 moves over the dead plate 2 onto conveyor 5. It will be noted that the bottles 3 and 4 are closely spaced longitudinally on the conveyor 5 and that the articles 3 and 4 delivered from the dead plate 2 are received on the conveyor 5 between other pairs of articles 14 and 15 which had been previously positioned on the conveyor from another section of the forming machine.

The speed of movement of the arm 6 will be synchronized with the speed of movement of the conveyor 5 to obtain the desired close spacing of the articles on the conveyor. As the conveyor moves forwardly in the direction of the arrow, the arm 6 returns from the dotted line position without substantially changing the position of the articles 3 and 4 on the conveyor. It will be noted that, when the arm 6 is in the dotted line position, the articles 3 and 4 are aligned substantially parallel to the length of the conveyor 5, with each pair of articles similarly positioned. This facilitates removal of the articles from the conveyor at the lehr stacker.

It will be understood that the pusher pockets will be shaped to suit the particular style of glassware being handle. For example, with panel type bottles instead of round bottles, rectangularly shaped pockets will be provided.

I claim:

1. In a device for transferring a pair of aligned articles of glassware positioned upon a supporting surface onto a moving conveyor disposed alongside the supporting surface at substantially the same level and extending generally at right angles to the aligned articles on said support and positioning the pieces on said conveyor in alignment generally parallel to the length of the conveyor, the combination of a pusher comprising a pair of article-receiving pockets open at one end and a guide projecting between said pockets and separating the same with one of the pockets positioned to receive one of said articles on said supporting surface and with said guide positioned obliquely with respect to the other of said articles, an arm carrying said pusher, and movable means operatively connected with said arm to move said arm with an oscillatory motion over said support to deliver said other article into the other of said pockets and to bring said pockets into a position over said conveyor with the open ends of said pockets disposed substantially parallel to the length of said conveyor and by return oscillatory movement of said arm to disengage said articles disposed in predetermined spaced alignment on said conveyor substantially parallel to the length thereof.

2. A device in accordance with claim 1 in which the pockets are separated only by said guide to provide for close spacing of the articles on the conveyor.

3. A device in accordance with claim 1 in which one of said pockets is disposed on each side of said guide and in which the guide is disposed therebetween and extends beyond the open ends of the pockets generally at right angles to a vertical plane intersecting the axes of the pockets.

4. In a device for transferring a pair of aligned articles of glassware positioned on a supporting surface to a moving conveyor disposed substantially at the same level as the supporting surface and extending generally at right angles to the aligned pieces on said support to deliver the pieces to said conveyor with the pieces aligned generally parallel to the length thereof, the combination of an arm pivoted for swinging movement above said supporting surface and conveyor from a position over said support to a position over said conveyor and for return swinging movement, a pusher connected to said arm and comprising a supporting bar adjustably received on said arm, a pair of article-receiving pockets, and a guide projecting beyond said pockets and separating the same, one of said pockets being positioned to receive an article on said support, said guide being positioned to deliver a second article on said support into said other pocket as said oscillating arm is swung over said support for delivery of said articles onto said conveyor aligned generally parallel to the length of the conveyor, and movable means operatively connected with said arm to move said arm with said swinging movement.

HERBERT ROSELLE, Jr.

REFERENCES CITED

The following references are of record in the file of this patent:

UNITED STATES PATENTS

| Number | Name | Date |
|---|---|---|
| 1,742,239 | Dotson | Jan. 7, 1930 |
| 2,363,681 | McNamara et al. | Nov. 28, 1944 |